United States Patent
Rozovski et al.

(10) Patent No.: US 12,112,305 B1
(45) Date of Patent: *Oct. 8, 2024

(54) SYSTEMS AND METHODS FOR REAL-TIME BILLER POSTING SERVICES

(71) Applicant: Wells Fargo Bank, N.A., San Francisco, CA (US)

(72) Inventors: Peter Rozovski, Concord, CA (US); Peter L. Shen, Castro Valley, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/688,449

(22) Filed: Mar. 7, 2022

Related U.S. Application Data (63) Continuation of application No. 16/137,208, filed on Sep. 20, 2018, now Pat. No. 11,270,279.

(51) Int. Cl.
*G06Q 20/14* (2012.01)

(52) U.S. Cl.
CPC .................................. *G06Q 20/14* (2013.01)

(58) Field of Classification Search
CPC ...................................................... G06Q 20/14
See application file for complete search history.

(56) References Cited

U.S. PATENT DOCUMENTS

| | | | |
|---|---|---|---|
| 9,928,518 B1 | 3/2018 | Vippagunta et al. | |
| 9,990,613 B1 | 6/2018 | Bhatt et al. | |
| 10,311,413 B2 | 6/2019 | Stroeh et al. | |
| 10,891,037 B1* | 1/2021 | Mackrell | G07G 1/01 |
| 11,010,763 B1* | 5/2021 | Fillinger | G06Q 20/40145 |
| 11,182,767 B1* | 11/2021 | Mateer | G06Q 20/3223 |
| 11,354,675 B1* | 6/2022 | Tuomikoski | G06Q 40/02 |
| 2008/0114657 A1 | 5/2008 | Forzley | |
| 2010/0205078 A1 | 8/2010 | Lawrence et al. | |
| 2011/0066517 A1 | 3/2011 | Smith et al. | |
| 2011/0125643 A1 | 5/2011 | Cameo et al. | |
| 2012/0136780 A1 | 5/2012 | El-Awady et al. | |

(Continued)

OTHER PUBLICATIONS

Kanchan Mahajan, "A novel method for automatic electricity billing system using Ad-Hoc networks," dated Jun. 2017, IEEE, https://ieeexplore.ieee.org/document/7955359?source=IQplus (Year: 2017).*

(Continued)

*Primary Examiner* — Raven E Yono
(74) *Attorney, Agent, or Firm* — Foley & Lardner LLP (57) ABSTRACT

Embodiments include a provider computing system associated with a provider including at least one processing circuit configured to present, by a graphical user interface while a bill pay application is in an unlaunched state, a notification including a plurality of summaries of at least one bill, automatically launch the bill pay application in response to the customer selecting a summary of the plurality of summaries of at least one bill, and automatically navigate to a sub-screen presenting the selected summary. The least one processing circuit further configured to receive, via the bill pay application, a request to pay an amount of funds to a biller, generate a payment request, provide at least one post to a funds account circuit based on the payment request, and generate and provide a payment data object to a biller computing system.

15 Claims, 5 Drawing Sheets

(56) References Cited

U.S. PATENT DOCUMENTS

| | | |
|---|---|---|
| 2012/0150706 A1 | 6/2012 | Hashir |
| 2013/0346302 A1 | 12/2013 | Purves et al. |
| 2015/0032636 A1* | 1/2015 | Wedekind ............ G06Q 20/204 |
| | | 705/76 |
| 2016/0012433 A1 | 1/2016 | Marenick |
| 2016/0247130 A1 | 8/2016 | Olmstead et al. |
| 2016/0328690 A1 | 11/2016 | Atwal et al. |
| 2018/0121975 A1* | 5/2018 | Weinflash .............. G06Q 30/06 |

OTHER PUBLICATIONS

Pensri Pukkasenunk, "An Efficient of Secure Mobile Phone Application for Multiple Bill Payments," dated Mar. 2016, IEEE, https://ieeexplore.ieee.org/document/7471248?source=IQplus (Year: 2016).*

Oladotun Omosebi, "An Openstack Based Accounting and Billing Service for Future Internet Applications," dated Mar. 2016, IEEE, https://ieeexplore.ieee.org/document/7474146?source=IQplus (Year: 2016).*

"Notifying a User When a Bill is Due Using a Notification on the User's Mobile Device," IP.com PAD dated Oct. 18, 2013 https://priorart.ip.com/IPCOM/000231951 (Year: 2013).

* cited by examiner

SYSTEMS AND METHODS FOR REAL-TIME BILLER POSTING SERVICES

CROSS-REFERENCE TO RELATED APPLICATIONS AND CLAIM OF PRIORITY

This application is a continuation of U.S. application Ser. No. 16/137,208, entitled "Systems and Methods for Real-Time Biller Posting Services," filed Sep. 20, 2018, which is incorporated herein by reference in its entirety and for all purposes.

BACKGROUND

The present disclosure relates generally to the field of systems and methods for executing real-time updates to digital account values. More particularly, the present disclosure relates to facilitating consumer-to-business bill payments by providing real-time, on-demand updates to multiple accounts associated with such a payment.

In a consumer-to-business bill payment, three "accounts" (i.e., digitally-stored data objects) are typically involved, including a customer funds account that tracks an amount of funds (e.g., money) available to a customer, a biller funds account that tracks an amount of funds available to the biller (e.g., received from customers), and a customer bill account that tracks an amount of funds owed to the biller by the customer. The customer funds account and the biller funds account are typically stored by a provider computing system, for example managed by a bank or other financial institution. The customer bill account is typically stored by a business biller computing system, for example managed by the biller or a billing service provider. Executing a digital consumer-to-business bill payment requires accurate updates to the values (i.e., amount of funds) electronically represented in each of the three accounts to reflect a decrease in value in the customer funds account, an increase in value in the biller funds account, and a decrease in value in the customer bill account.

To deal with these complexities, existing systems and methods require multiple separate entities and computing systems that cause substantial delays (e.g., several days) in fully executing customer-to-business bill payments. Such delays create confusion among customers, tie up funds in pending transactions that otherwise may be used for other transactions, require substantial computing resources, and otherwise reduce the usability of bill payment systems and graphical user interfaces such as those provided with mobile banking applications.

SUMMARY

One embodiment of the present disclosure relates to a provider computing system. The provider computing system includes a bill pay application circuit configured to receive a request from a user to pay an amount of funds to a biller, determine a customer funds account number for the user, determine a biller funds account number for the biller, and generate a payment request that includes the customer funds account number, the biller funds account number, and the amount of funds. The provider computing system also includes a transaction management system configured to receive the payment request from the bill pay circuit and provide a first post to a funds account circuit. The first post includes an instruction to deduct the amount from a customer funds account associated with the customer funds account number. The transaction management system is also configured to provide a second post to the funds account circuit. The second post includes an instruction to add the amount to a biller funds account associated with the biller funds account number. The transaction management system is also configured to generate a payment notification. The provider computing system also includes a biller posting services circuit configured to receive the payment notification, and determine a customer bill account number corresponding to the payment notification. The customer bill account number identifies a customer bill account of a biller computing system. The biller posting services circuit is also configured to generate a data object that includes the payment notification and the customer bill account number and cause the data object to be provided to the biller computing system.

Another embodiment of the present disclosure is a method. The method includes receiving, by a provider computer system, a request from a user to pay an amount of funds to a biller, determining, by the provider computer system, a customer funds account number for the user, determining, by the provider computing system, a biller funds account number for the biller, and generating, by the provider computing system, a payment request that includes the customer funds account number, the biller funds account number, and the amount of funds, and providing, based on the payment request, a first post to a funds account circuit. The first post instructs the funds account circuit to deduct the amount from a customer funds account associated with the customer funds account number. The method also includes providing, based on the payment request, a second post to the funds account circuit. The second post instructs the funds account circuit to add the amount to a biller funds account associated with the biller funds account number. The method also includes generating, by the provider computing system, a payment notification, and determining, by the provider computing system, a customer bill account number corresponding to the payment notification. The customer bill account number identifies a customer bill account of a biller computing system. The method also includes generating, by the provider computing system, a data object that includes the payment notification and the customer bill account number and providing the data object to the biller computing system.

Another embodiment of the present disclosure relates to an apparatus. The apparatus includes a user device operable to display a graphical user interface relating to a bill. The bill indicates that the user owes an amount of funds to a biller. The apparatus also includes a biller computing system associated with the biller and configured to store a customer bill account that tracks the amount of funds owed to the biller by the user and a provider computing system communicably coupled to the user device and the biller computing system. The provider computing system is configured to receive a request from the user device to pay the amount of funds to the biller, determine a customer funds account number associated with the user, a biller funds account number associated with the biller, and a customer bill account number corresponding to the customer bill account, deduct the amount of funds from a customer funds account corresponding to the customer funds account number and add the amount of funds to a biller funds account corresponding to the biller funds account number, generate a data object that comprises the amount of funds and the customer bill account number, and provide the data object to the biller computing system.

DETAILED DESCRIPTION

Referring to the figures generally, systems and methods for executing real-time updates to digital account values to facilitate consumer-to-business bill payments are shown and described herein. The system includes a provider computing system that receives bills from a biller, associates each bill with a user of a bill pay application, and generates a graphical user interface that provides a user with information about a bill and allows the user to request to pay the bill. The provider computing system also receives a request from a customer to pay a bill, posts a debit to the customer funds account and a credit to the biller funds account to represent a transfer of funds corresponding to payment of the bill, generates a payment notification, associate the payment notification with a customer bill account number for a biller computing system, and provides the payment notification and the customer bill account number to the biller computing system.

The embodiments and implementations of the systems and methods disclosed herein improve current computing systems by providing for real-time bill payments and bill settlement, eliminating substantial delays common with other implementations of electronic bill payment systems. By posting both a debit to the customer funds account and a credit to the biller funds account while simultaneously notifying a biller computing system of the payment, the systems and methods described herein allow for real-time or substantially real-time updates to be made to the customer funds account, the biller funds account, and the customer bill account to fully execute a customer-to-business bill payment. The systems and methods disclosed herein may also eliminate a need for one or more third-party computing systems or third-party entities that may process payment requests in other electronic bill payment approaches, thereby eliminating a cybersecurity risk vector and reducing potential data privacy concerns. Elimination of a third party processor may also substantially speed transaction times and improves efficiency. As such, the systems and methods disclosed herein improve the functioning of such electronic bill payment systems by providing functionalities that are novel and non-obvious improvements over current systems.

In various embodiments disclosed herein, a graphical user interface (GUI) displayed on one or more user devices can present a notification to the respective user providing a summary of a transaction (e.g., a bill payment) or a requested transaction (e.g., a new bill for which payment is owed by the user). The notification can be provided in the form of an application summary reachable directly from a menu of the mobile device of the user (e.g., by hovering over an application icon of a mobile wallet application, by selecting the application icon without actually launching the application). The application summary indicates a summary of the payment or bill (e.g., an amount of the payment/bill). By selecting the application summary, the mobile wallet application (e.g., bill pay application) is launched and automatically navigated to a sub-screen of the application providing additional and more specific details of the transaction or bill (e.g., time of transaction, currency used, whether the payment is a repeat payment from a same prior payer, amount owed, biller identity, detailed invoice). The application summary can provide a summary of more than one transactions or bills (e.g., a list of bills received organized by due date). Accordingly, the application summary provides only limited data when the application is in an unlaunched state, and further details of each transaction can be accessed by selecting the corresponding transaction/bill summary to automatically launch the application and to be automatically navigated to the corresponding sub-screen displaying additional and more specific details of the transaction or bill, thereby providing an improved GUI for electronic devices, and particularly electronic mobile devices.

Figure 1:
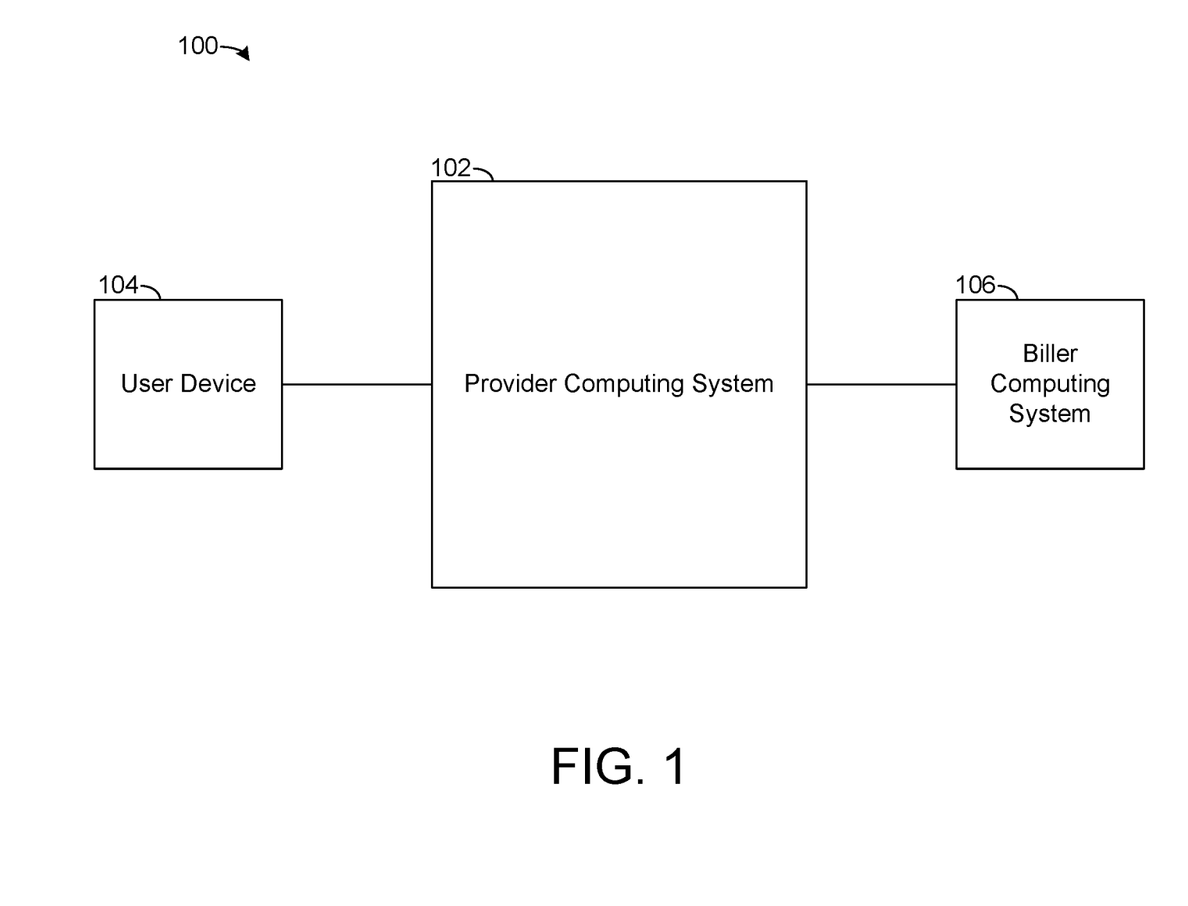
FIG. 1 is a block diagram of a system for executing real-time updates to digital account values to facilitate consumer-to-business bill payments, according to an exemplary embodiment.

Referring now to FIG. 1, a block diagram of a system 100 for executing real-time updates to digital account values to facilitate consumer-to-business bill payments is shown, according to an exemplary embodiment. The system 100 includes a provider computing system 102 communicably coupled to a user device 104 and a biller computing system 106. The provider computing system 102, the user device 104, and the biller computing system 106 may be communicable via a network, for example the internet.

The user device 104 is configured to allow a user to view one or more graphical user interfaces relating to consumer-to-business bill payments, for example relating to payments and requests for payment from the user to one or more businesses. The user device 104 also allows the user to provide inputs relating to the content of the graphical user interfaces, for example to request payment of a bill. Accordingly, the user device 104 is associated with a user billed by a business, for example in return for goods or services purchased by the user from the business (i.e., from the biller). In some cases, the user is a consumer. In other cases, the user is a representative of a second business or other entity which purchases goods and/or services from the biller. According to various embodiments, the user device 104 may include one or more of a smartphone, tablet, laptop, desktop computer, virtual or augmented reality headset, and/or other personal computing device.

The biller computing system 106 is configured to electronically maintain one or more customer bill accounts that each track an amount of funds owed to the biller by a customer. Accordingly, the biller computing system 106 is associated with a biller, i.e., a business or other entity that charges customers an amount of funds in return for goods or services provided by the biller. In various cases, the biller may be a credit card provider, a utility company, a landlord or property management company, an insurer, a healthcare provider, or some other type of entity. As described in detail below, the biller computing system 106 may provide bill information to the provider computing system 102 and receive payment notifications from the provider computing system 102. The biller computing system 106 may update a value of a customer bill account in response to receiving a payment notification.

Figure 2:
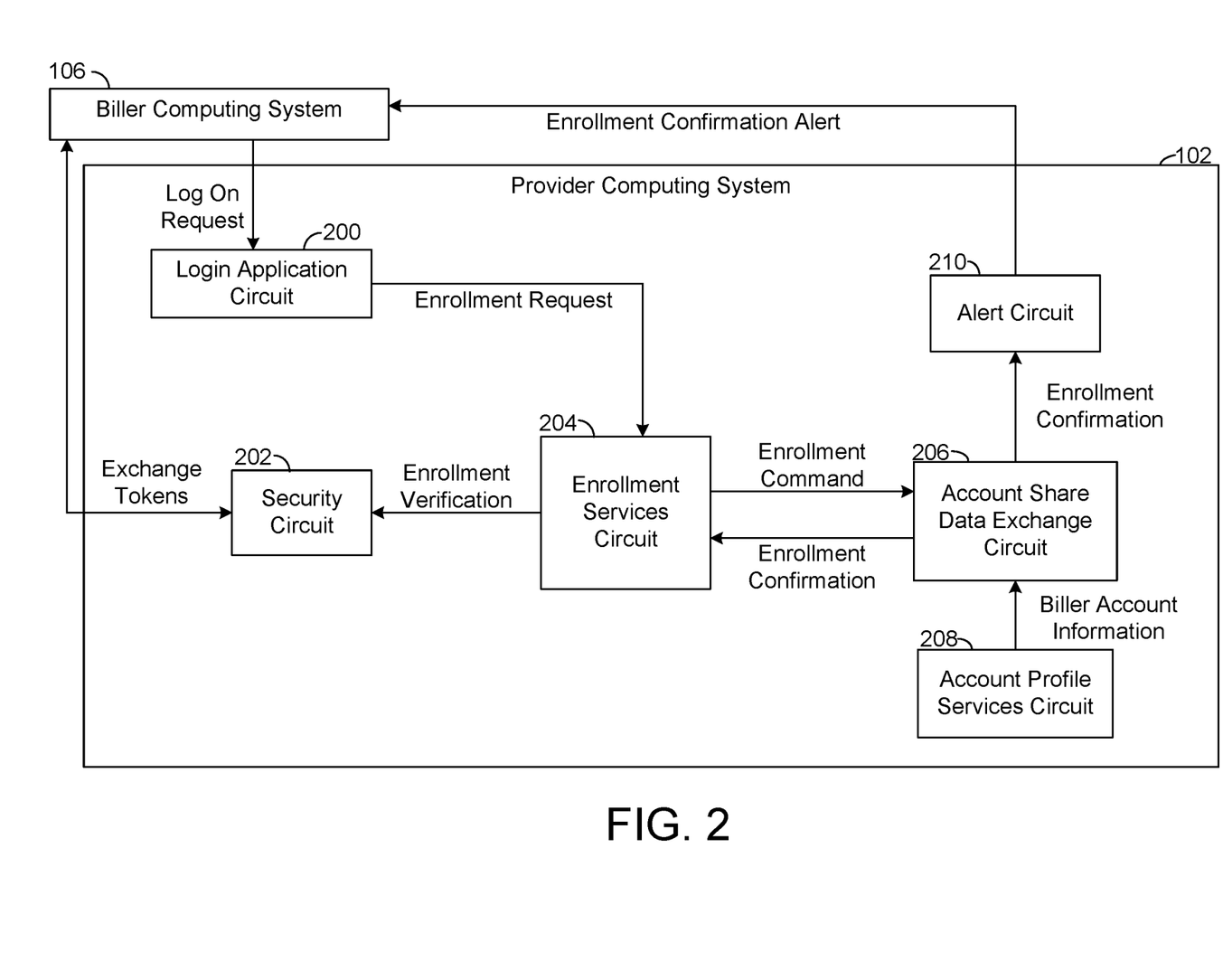
FIG. 2 is a first detailed block diagram of a provider computing system of the system of FIG. 1, according to an exemplary embodiment.
Figure 3:
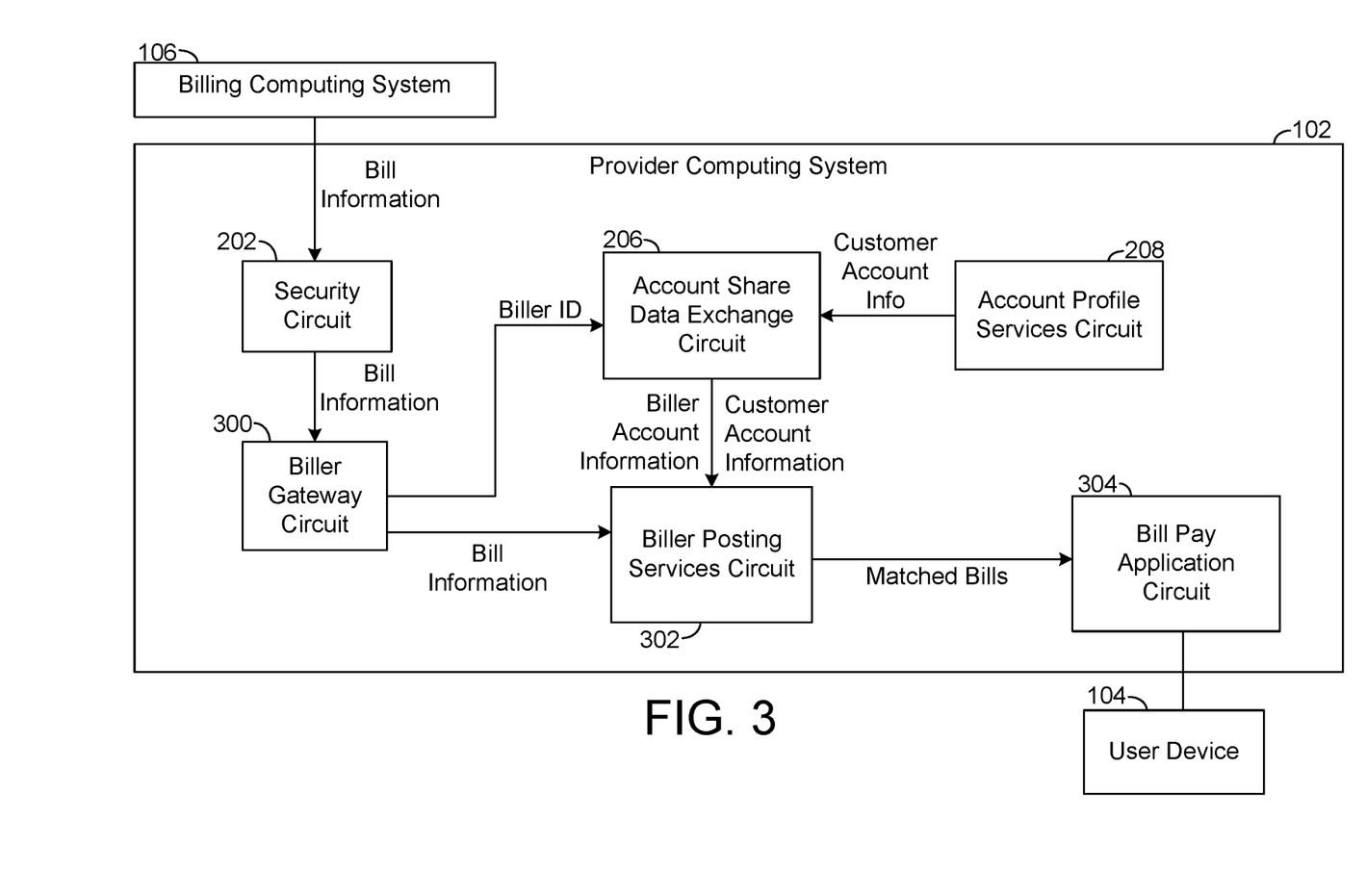
FIG. 3 is a second detailed block diagram of the provider computing system of FIG. 2, according to an exemplary embodiment.
Figure 4:
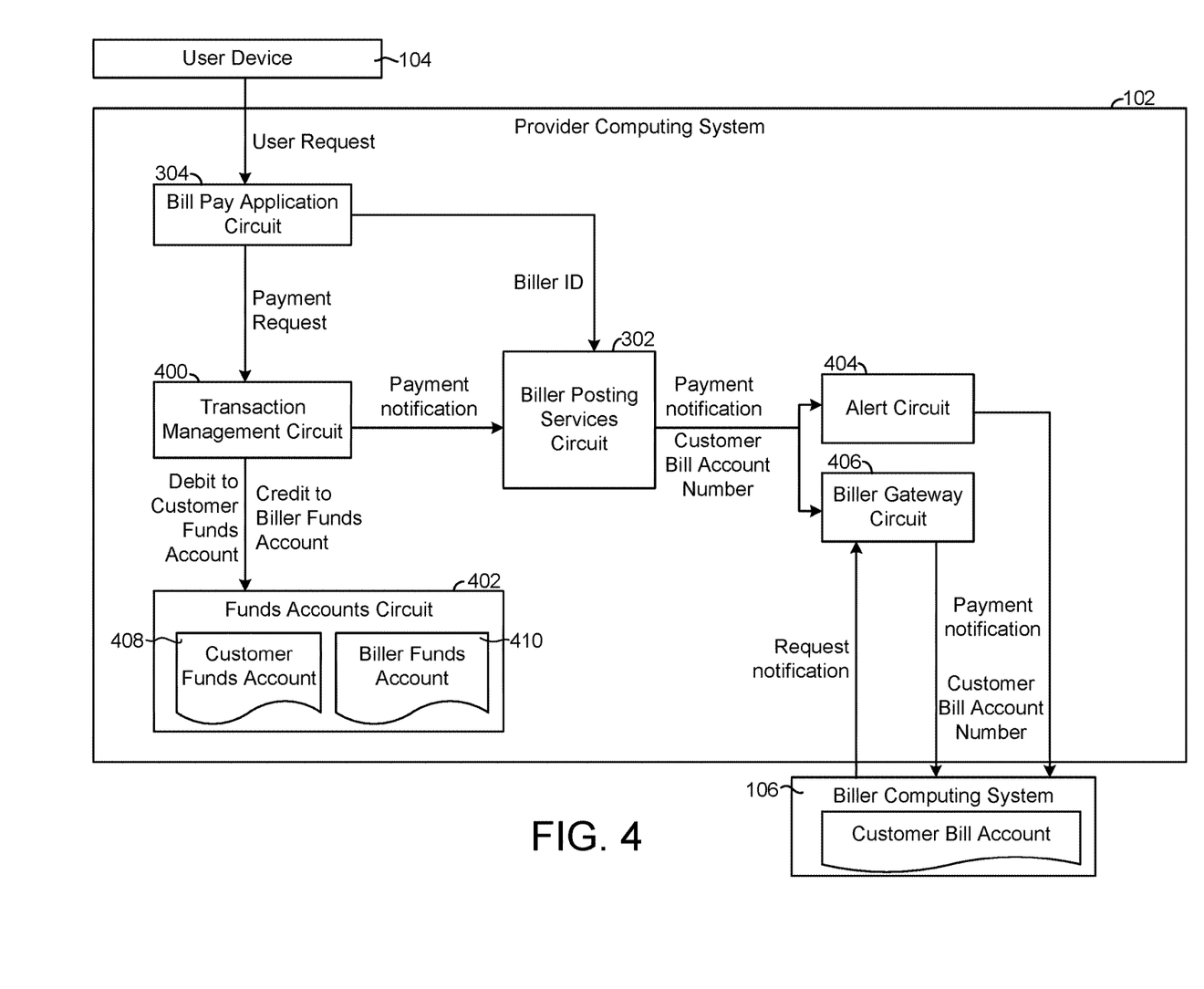
FIG. 4 is a third detailed block diagram of the provider computing system of FIG. 2, according to an exemplary embodiment.

The provider computing system 102 is configured to execute various functions to facilitate real-time updates to digital account values to facilitate consumer-to-business bill payments as described in detail below with reference to FIGS. 2-5. In particular, FIG. 2 provides a detailed view of the provider computing system 102 that illustrates that the provider computing system 102 may be configured to facilitate enrollment of a biller in a biller posting service. FIG. 3 provides another detailed view of the provider computing system 102 that illustrates that the provider computing system 102 may be configured to receive bill information from the biller computing system 104, determine customers of the biller based on the bill information, and associate bills with users of a bill payment application provided by the provider computing system 102. FIG. 4 provides another detailed view of the provider computing system 102 that illustrates that the provider computing system 102 may be configured to receive a request to pay a bill from a user and, in response to the request, decrease a value represented by the customer funds account, increase a value represented by the biller funds account, and cause the biller computing system 106 to update the customer bill account stored by the biller computing system 106.

Accordingly, the provider computing system 102 may be associated with a provider entity that provides and maintains one or more financial accounts (e.g., demand deposit account, credit or debit card account, savings account, checking account, brokerage account, mortgage account) on behalf of the user and/or the biller. Accordingly, the provider entity may include one or more commercial or private banks, credit unions, investment brokerages, mobile wallet providers, or other account providers.

Referring now to FIG. 2, a detailed block diagram of the provider computing system 102 is shown, according to an exemplary embodiment. FIG. 2. illustrates that the provider computing system 102 may be configured to facilitate enrollment of a biller in a biller posting service.

As shown in FIG. 2, the provider computing system 102 includes a login application circuit 200, a security circuit 202, an enrollment services circuit 204, an account data share circuit 206, an account profile services circuit 208, and an alert circuit 2010. The circuits 200-210 are communicably coupled to one another. It should be understood that the arrangement and distribution of the various circuits is highly configurable, and that the various functions and features described herein may be attributed to various circuits in various embodiments.

The login application circuit 200 is communicable with the biller computing system 106 to receive a log-on request from the biller computing system 106. In response to receiving a log-on request from the biller computing system 106, the login application circuit 200 determines whether the biller is already enrolled in the biller posting service, for example by storing and accessing a look-up table of existing enrolled billers (e.g., a list of biller usernames). In some embodiments, the login application circuit 200 queries the enrollment services circuit 204 to determine whether the biller is already enrolled in the biller posting service. If the login application circuit 200 determines that the biller associated with the biller computing system 106 is not yet enrolled, the login application circuit 200 generates an enrollment request for the biller and provides the enrollment request to the enrollment services circuit 204.

The enrollment services circuit 204 receives the enrollment request for the biller from the login application circuit 200, and in response, initiates an enrollment process to enroll the biller in the biller posting services provided by the provider computing system 102 and described in detail below. For example, the enrollment services circuit 204 may generate an enrollment command and provides the enrollment command to the account share data exchange circuit 206.

The enrollment command from the enrollment services circuit 204 causes the account share data exchange circuit 206 to collect information relating to one or more biller accounts stored and managed by the provider computing system 102 (e.g., provided by the provider entity). The account profile services circuit 208 is configured to store such account information for all types of accounts of the provider computing system 102. As illustrated in FIG. 2, the account share data exchange circuit 206 queries the account profile services circuit 208 for information relating to accounts of the biller. In response, the account profile services circuit 208 identifies accounts of the biller and provides biller account information (e.g., account number, account type) to the account share data exchange circuit 206. The account share data exchange circuit 206 thereby aggregates biller account information. In the examples described herein, the biller account information aggregated by the account share data exchange circuit 206 includes an account number for a biller funds account designated to receive funds during a bill payment by a customer, for example as described in detail below.

In response to receiving the biller account information from the account profile services circuit 208, the account share data exchange circuit 206 may transmit an enrollment confirmation to an alert circuit 210. The alert circuit 210 is communicable with the biller computing system 106. The alert circuit 210 is configured to generate alerts (e.g., messages, notifications) and provide the alerts to the biller computing system. As illustrated in FIG. 2, the alert circuit 210 may generate an enrollment confirmation alert and provide the enrollment confirmation alert to the biller computing system 106.

In response to receiving the biller account information from the account profile services circuit 208, the account share data exchange circuit 206 may also provide an enrollment confirmation to the enrollment services circuit 204. In response, the enrollment services circuit may store an indication that the biller is enrolled. The enrollment services circuit 204 may also prompt the security circuit 202 to perform a security verification to verify enrollment, verify authentication of the biller computing system 106, and/or set up a verification and security feature to facilitate later logins by the biller computing system. For example, the security circuit 202 may exchange security tokens with the biller computing system 106 to verify the identity of the biller computing system 106 and/or provide a security token to the biller computing system 106 for use by the biller computing system 106 in logging into the provider computing system 102 at later times.

The provider computing system 102 thereby allows a biller computing system 106 to be enrolled in a service, for example a biller posting service as described in detail below.

Referring now to FIG. 3, another detailed block diagram of the provider computing system 102 is shown, according to an exemplary embodiment. FIG. 3 illustrates that the provider computing system 102 may be configured to receive bill information from the biller computing system 106, determine customers of the biller based on the bill information, and associate bills with users of a bill payment application provided by the provider computing system 102. As shown in FIG. 3, the provider computing system 102 includes the security circuit 202, a biller gateway circuit 300, the account share data exchange circuit 206, the account profile services circuit 208, the biller posting services circuit 302, and a bill pay application circuit 304. Circuits 200-210, 300-304 may be communicably coupled to one another. It should be understood that the arrangement and distribution of the various circuits is highly configurable, and that the various functions and features described herein may be attributed to various circuits in various embodiments.

As illustrated in FIG. 3, the biller computing system 106 may log into the provider computing system 102 and provide bill information to the provider computing system 102. The biller computing system 106 may access the provider computing system 102 via the security circuit 202. The security circuit 202 may validate that the biller computing system 106 has permission to access the provider computing system 102, for example by authenticating a security token provided by the biller computing system 106.

If authenticated by the security circuit 202, the biller computing system 106 interfaces with the biller gateway circuit 300 to provide bill information to the provider computing system 102. The biller gateway circuit 300 provides one or more application programming interfaces to facilitate interoperability between the biller computing system 106 and the provider computing system 102. Via the biller gateway circuit 300, the biller computing system 106 provides a biller ID to the account share data exchange circuit 206 and bill information to the biller posting services circuit 302. The biller ID may be any identifier of the biller that may be used by the account share data exchange circuit to identify accounts of the biller, i.e., to retrieve biller account information aggregated by the account share data exchange circuit 206 during the enrollment process described with reference to FIG. 2. Bill information may include a list of bills that indicate that a customer owes funds to the biller, a set of bill data objects, or some other representation of bills issued by the biller computing system 106. For each bill, the bill information may include an amount of funds owed, a due date, a customer name, a customer bill account number, a customer address, a customer phone number, a customer email address, and/or other information relating to the customer, the biller, goods and/or services provided by the biller, and/or the funds owed by the customer, for example stored as attributes of a bill data object.

The account share data exchange circuit 206 is configured to receive the biller ID and, in response, to retrieve the biller account information (e.g., a biller funds account number) and provide the biller account information to the biller posting services circuit 302. The account share data exchange circuit 206 also receives customer account information from the account services circuit 208. The customer account information may include information relating to all customers of the provider entity, relating to all customers with a particular product or account provided by the provider entity, or relating to some other set or subset of customers. The customer account information may include customer funds account numbers, customer names, customer addresses, customer email addresses, etc. The account share data exchange circuit 206 provides the customer account information to the biller posting services circuit 302.

The biller posting services circuit 302 is configured to receive the bill information, the biller account information, and the customer account information. The biller posting services circuit 302 is also configured to match bills to customers based on the bill information and the customer account information. For example, the biller posting services circuit 302 may process the bill information and the customer account information to identify matches between one or more of customer names, customer addresses, customer phone numbers, customer email addresses, etc. that appear in both the bill information and the customer account information. For example, the biller posting services circuit 302 may determine that a customer name for a bill (i.e., from the bill information form the biller computing system 106) is identical or substantially identical to a customer name associated with a customer funds account (i.e., in the customer account information from the account share data exchange circuit 206), and in response, associate the corresponding bill with the corresponding customer. In some embodiments, the biller posting services circuit 302 validates a match between a bill and a customer by checking whether a second attribute (e.g., customer address, customer phone number, or customer email address) is identical or substantially identical in both the bill information for that bill and the customer account information for that customer.

The biller posting services circuit 302 thereby identifies customers of the provider (i.e., people or entities with account(s) managed by the provider computing system 102) from whom the biller is requesting funds. The biller posting services circuit 302 may also associate each identified customer with one or more bills included in the bill information from the biller computing system 106. The biller posting services circuit 302 may further associate each bill with a biller funds account number that identifies the biller funds account, i.e., the account to which funds may be transferred to pay the bill. The biller posting services circuit 302 may also identify a customer bill account number (i.e., an identifier for the customer bill account used by the biller computing system 106) for each bill and/or for each customer associated with a bill.

In some embodiments, the biller posting services circuit 302 generates and/or updates a bill data object that includes attributes that identify a customer funds account number, a customer bill account number, a biller funds account number, and a bill amount. The bill data object may also include additional attributes, for example a customer name, a biller name, a bill description, a due date, etc. In some embodiments, the biller posting services circuit 302 provides the bill data objects to the bill pay application circuit 304.

The bill pay application circuit 304 is configured to provide a mobile application and/or browser-based application that allows a user (customer) to view, manage, and pay bills via the user device 104. For example, the bill pay application circuit 304 may receive the bill data objects from the biller posting services circuit 302. For a particular user, the bill pay application circuit 304 may identify the one or more bills matched with that user and aggregate the information relating to those bills. The bill pay application circuit 304 may then generate a graphical user interface that includes a list of the bills matched to the user and provide the graphical user interface to the user device 140. The user of the user device 104 may therefore view bill information from the biller computing system 106 within a bill pay application or webpage associated with the provider entity, including, in some cases, bill from multiple billers or multiple biller computing system 106. The bill pay application circuit 304 may also store and/or display an indication that a biller is enrolled the biller posting services as described with reference to FIG. 2.

Referring now to FIG. 4, another block diagram of the provider computing system 102 is shown, according to an exemplary embodiment. FIG. 4 illustrates that the provider computing system 102 may be configured to receive a request to pay a bill from a user, and in response to the request, decrease a value represented at the customer funds account, increase a value represented at the biller funds account, and cause the biller computing system 106 to update the customer bill account stored by the biller computing system 106. As shown in FIG. 4, the provider computing system 102 includes the bill pay application circuit 304, a transaction management circuit 400, a funds account circuit 402, the biller posting services circuit 302, the alert circuit 210, and the biller gateway circuit 300. The circuits 200-210, 300-304, and 400-402 may be communicably coupled to one another. It should be understood that the arrangement and distribution of the various circuits is highly configurable, and that the various functions and features described herein may be attributed to various circuits in various embodiments.

As mentioned above with reference to FIG. 3, the bill pay application circuit 304 may generate a graphical user interface that includes bill information relating to one or more bills and provide the graphical user interface to the user device 104. The graphical user interface may include an option that allows the user to request to pay a bill. Accordingly, a user may input a user payment request to the user device 104 by tapping, touching, swiping, sliding, clicking, typing, etc. on an input device of the user device 104. The user device 104 may transmit the user payment request to the bill pay application.

The bill pay application circuit 304 receives the payment request from the user device 104. In response to receiving the user payment request from the user device 104, the bill pay application circuit 304 identifies an amount of funds to transfer, a customer funds account number identifying the customer funds account from which funds should be deducted, and a biller funds account number identifying the biller funds account to which funds should be added. The bill pay application circuit 304 may package this information as a payment request object and provide the payment request object to the transaction management circuit 400. The bill pay application circuit 304 may also identify a biller ID for the bill that the user requested to pay provide the biller ID to the biller posting services circuit 302.

The transaction management circuit 400 is configured to receive the payment request form the bill pay application circuit 304. In response, the transaction management circuit 400 generates a first post for a debit to the customer funds account in the amount that the user requested to pay and a second post for a credit to the biller funds account for the same amount. The first post and the second post may be memo posts or hard posts. The transaction management circuit 400 provides the first post and the second post to the funds accounts circuit 402.

The funds accounts circuit 402 is configured to store and maintain the customer funds account and the biller funds account. For example, the funds accounts circuit 402 may store the customer funds account as a customer funds account database object 408 with attributes that include the customer funds account number and a current value (e.g., a numerical quantity) of the customer funds account. The biller funds account may as a biller funds account database object 410 with attributes that include the biller funds account number and a current value (e.g., a numerical quantity) of the biller funds account.

The funds account circuit 402 receives the first post and the second post from the transaction management circuit 400. In response to receiving the first post, the funds account circuit 402 decreases the current value of the customer funds account by the payment amount requested by the user. For example, the funds account circuit 402 may read the current value attribute from the customer funds account database object 408, subtract the payment amount from the current value to determine a new value, and update the current value attribute of the customer funds account database object 408 to be the new value. In response to receiving the second post, the funds account circuit 402 increases the current value of the biller funds account by the payment amount requested by the user. For example, the funds account circuit 402 may read the current value attribute from the biller funds account database object 410, add the payment amount to the current value to determine a new value, and update the current value attribute of the biller funds account database object 408 to be the new value. The provider computing system 102 thereby executes a transfer of funds from the customer to the biller.

In alternative embodiments, one or both of the customer funds account and the biller funds account are held by one or more external computing systems (e.g., maintained by other provider entities). In such embodiments, the transaction management circuit 400 may transmit the first post and the second post to an automated clearing house or real-time payment system to cause the execution of the changes in value of the customer funds account and the biller funds account.

As shown in FIG. 4, the transaction management circuit 400 also generates a payment notification that indicates that first post and the second post have been posted to the funds account circuit 402. The transaction management circuit 400 provides the payment notification to the biller posting services circuit 302.

The biller posting services circuit 302 is configured to receive the payment notification from the transaction management circuit 400 and the biller ID from the bill pay application circuit 304. Based on the payment notification, the biller ID, and/or bill and/or customer information aggregated as described above with reference to FIG. 3, the biller posting services circuit 302 associates the payment notification with a customer bill account number for the customer. For example, the biller posting services circuit 302 may generate a payment notification data object that includes an amount of a payment and the customer bill account number associated with that payment. The biller posting services circuit 302 provides the payment notification and the customer bill account number (e.g., the payment notification data object) to the alert circuit 404 and/or the biller gateway circuit 406. By automatically linking the payment notification with the customer bill account number (i.e., an identifier of the customer bill account maintained by the biller computing system 106) within the provider computing system 102, the biller posting services circuit 302 may substantially reduce and/or eliminate delays and/or errors which may be caused in other implementations in which the biller computing system 106 or some third party entity or computing system independently attempts to associate payments with customer bill accounts.

The biller posting services circuit 302 is also configured to store and/or determine biller preferences relating to the delivery of payment notifications to the biller computing system 106. In the example shown in FIG. 4, the preferences include an option to receive payment notifications via the alert circuit 404 or via the biller gateway circuit 406.

The alert circuit 404 is configured to receive the payment notification and the customer bill account number from the biller posting services circuit 302 and push an alert to the biller computing system 106 that includes the payment notification and the customer bill account number. In some embodiments, the alert is sent in real time, e.g., immediately or substantially immediately following receipt of the payment notification and the customer bill account number from the biller posting services circuit 302. In other embodiments, alerts are sent at a preset frequency (e.g., every hour, every day), in a preset batch size (e.g., as groups of 50 payment notifications), or some combination thereof.

The biller gateway circuit 406 is configured to receive the payment notification and the customer bill account number from the biller posting services circuit 302 and hold the payment notification and the customer bill account number for retrieval by the biller computing system 106. The biller gateway circuit 406 may include one or more application programming interfaces that provide interoperability between the biller computing system 106 and the provider computing system 102, for example to allow the biller computing system 106 to access payment notifications (and associated customer bill account numbers) on demand from the biller computing system 106.

The alert circuit 404 and the biller gateway circuit 406 thereby provide the biller computing system 106 with multiple options relating to how to payment notifications and associated customer bill account numbers from the provider computing system 102. In this regard, some degree of customizability in the biller computing system 106 is facilitated to fulfill the requirements of various billers. In preferred embodiments, the biller computing system 106 receives and/or retrieves the payment notifications and associated customer bill account numbers in substantially real time, i.e., within a short duration of time after the user requests payment via the user device 104.

The biller computing system 106 is configured to store the customer bill account. For example, the biller computing system 106 may store the customer bill account as a customer bill account database object 412 with attributes that include the customer bill account number and a current value (e.g., a numerical quantity) of the customer bill account. In response to receiving/retrieving a payment notification and a customer bill account number from the provider computing system 102, the biller computing system 106 updates the current value of the customer bill account. For example, the biller computing system 106 may read the current value from the customer bill account database object 412, adjust the current value by the payment amount to determine a new value, and update the current value attribute to be the new value. In a case where the user requested to pay the full outstanding balance on a bill, the new value stored for the customer bill account may be zero. Settlement of the customer bill account may therefore be quickly, efficiently, and accurately completed without undue delays common in other implementations. In some embodiments, the biller computing system 106 may push a notification to the user device 104 (via the provider computing system 102 or otherwise) indicating the new value of the customer bill account.

Figure 5:
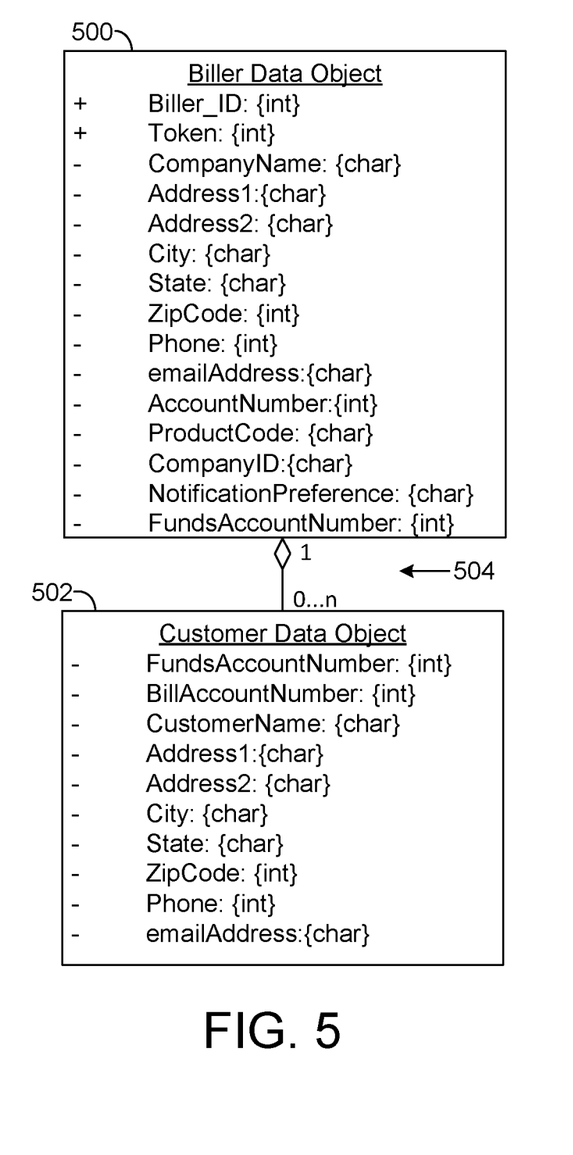
FIG. 5 is a depiction of a data model for use with the provider computing system of FIGS. 1-4, according to an exemplary embodiment.

Referring now to FIG. 5, a representation of a biller data object 500 and a customer data object 502 is shown according to an exemplary embodiment. FIG. 5 illustrates an example data model that may be used to facilitate the systems and methods described above with reference to FIGS. 1-4. As shown in FIG. 5, the biller data object 500 includes various attributes (e.g., biller ID, company name, address) that may be defined by either integers or characters to characterize a biller. Each customer data object 502 also includes various attributes (e.g., customer funds account number, customer bill account number, customer name) that may be defined by either integers or characters to characterize the customer. As indicated by connector 504, one biller may be associated with multiple customers (shown as Customer 0 through Customer n). The provider computing system 104 may use the biller data object 500 and the customer data object 502 as described in detail above to facilitate real-time bill payment and settlement as described in detail above.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An example system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example embodiments described herein.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A provider computing system associated with a provider, comprising:
   at least one processing circuit configured to:
      receive, in response to authenticating a biller computing system, bill information associated with a biller and customer account information associated with a plurality of customers of a provider, the bill information comprising a biller number;
      determine a customer number of a customer of the plurality of customers;
      identify a plurality of bills matched with the customer based on cross-referencing the bill information associated with the biller provided to the provider computing system by the biller computing system and the customer account information associated with the customer by comparing one or more first customer identifiers present in the bill information with one or more second customer identifiers present in the customer account information and identifying one or more matches between the one or more first customer identifiers and the one or more second customer identifiers;
      aggregate information of the plurality of bills;
      present, by a graphical user interface on a user device associated with the customer while a bill pay application is in an unlaunched state, a notification including at least one summary of the aggregated information of the plurality of bills, the at least one summary comprising an amount of the plurality of bills;
      automatically launch, by the user device, the bill pay application in response to the customer selecting a summary of the at least one summary;
      automatically navigate, by the user device, to a sub-screen of the bill pay application, the sub-screen presenting the selected summary;
      receive, via the bill pay application, a request to pay an amount of funds to the biller;
      generate a payment request comprising the customer number, the biller number, and the amount of funds;
      provide at least one post to a funds account circuit based on the payment request, the at least one post comprising instructions to deduct the amount of funds from a customer account associated with the customer number and add the amount of funds to a biller account associated with the biller number;
      generate and provide a payment data object comprising a plurality of attributes associated with the request and the customer to the biller computing system, wherein generating and providing the payment data object to the biller computing system further comprises enabling, with an application programming interface (API), the biller computing system to access the provider computing system to retrieve the payment data object, and wherein the plurality of attributes comprises at least a current value attribute; and update, via the API, the current value attribute of the payment data object to a new value based on the amount of funds.

2. The system of claim 1, wherein generating and providing the payment data object to the biller computing system further comprises pushing the payment data object to the biller computing system in real time.

3. The system of claim 1, wherein the at least one processing circuit is further configured to:

update the customer account and the biller account based on the payment data object.

4. The system of claim 1, wherein the at least one processing circuit is further configured to:

generate a bill data object that comprises the customer number, the amount of funds, and the biller number.

5. The system of claim 1, wherein the graphical user interface is a first graphical user interface, and wherein the at least one processing circuit is further configured to:

generate a second graphical user interface for presentation to the customer based on the bill information and in response to the bill pay application being launched, the second graphical user interface allowing the customer to initiate a second payment request to pay a second amount of funds.

6. The system of claim 5, wherein the at least one processing circuit is further configured to:

present the second graphical user interface on the user device.

7. A method of performing bill payments, the method comprising:

receiving, in response to authenticating a biller computing system, bill information associated with a biller and customer account information associated with a plurality of customers of a provider, the bill information comprising a biller number;

determining a customer number of a customer of the plurality of customers;

identifying, by at least one processing circuit, a plurality of bills matched with the customer based on cross-referencing the bill information associated with the biller provided to a provider computing system by the biller computing system and the customer account information associated the customer by comparing one or more first customer identifiers present in the bill information with one or more second customer identifiers present in the customer account information and identifying one or more matches between the one or more first customer identifiers and the one or more second customer identifiers;

aggregating, by the at least one processing circuit, information of the plurality of bills;

presenting, by a graphical user interface of a user device associated with the customer while a bill pay application is in an unlaunched state, a notification including at least one summary of the aggregated information of the plurality of bills, the at least one summary comprising an amount of the plurality of bills;

automatically launching, by the user device, the bill pay application in response to the customer selecting a summary of the at least one summary;

automatically navigating, by the user device, to a sub-screen of the bill pay application, the sub-screen presenting the selected summary;

receiving, by the at least one processing circuit via the bill pay application, a request to pay an amount of funds to the biller;

generating, by the at least one processing circuit, a payment request comprising the customer number, the biller number, and the amount of funds;

providing, by the at least one processing circuit, at least one post to a funds account circuit based on the payment request, the at least one post comprising instructions to deduct the amount of funds from a customer account associated with the customer number and add the amount of funds to a biller account associated with the biller number;

generating and providing, by the at least one processing circuit, a payment data object comprising a plurality of attributes associated with the request and the customer to the biller computing system, wherein generating and providing the payment data object to the biller computing system further comprises enabling, with an application programming interface (API), the biller computing system to access the provider computing system to retrieve the payment data object, and wherein the plurality of attributes comprises at least a current value attribute; and updating, by the at least one processing circuit via the API, the current value attribute of the payment data object to a new value based on the amount of funds.

8. The method of claim 7, wherein generating and providing the payment data object to the biller computing system further comprises pushing the payment data object to the biller computing system in real time.

9. The method of claim 7, further comprising:

updating, by the at least one processing circuit, the customer account and the biller account based on the payment data object.

10. The method of claim 7, further comprising:

generating, by the at least one processing circuit, a bill data object that comprises the customer number, the amount of funds, and the biller number.

11. The method of claim 7, wherein the graphical user interface is a first graphical user interface, the method further comprising:

generating, by the at least one processing circuit, a second graphical user interface for presentation to the customer based on the bill information and in response to the bill pay application being launched, the second graphical user interface allowing the customer to initiate a second payment request to pay a second amount of funds.

12. The method of claim 11, further comprising:

presenting, by the at least one processing circuit, the second graphical user interface on the user device.

13. One or more non-transitory computer-readable storage media having instructions stored thereon that, when executed by at least one processing circuit, cause the at least one processing circuit to:

receive a security token from a biller computing system associated with a biller; and authenticate the biller computing system based on the security token;

receive, in response to authenticating the biller computing system, bill information associated with the biller and customer account information associated with a plurality of customers of a provider, the bill information comprising a biller number;

determine a customer number of a customer of the plurality of customers;

identify a plurality of bills matched with the customer based on cross-referencing the bill information associated with the biller and relating to a requested transaction, provided to a provider computing system by a biller gateway circuit of the biller computing system, and the customer account information associated with the customer via a biller posting services circuit configured to compare one or more first customer identifiers present in the bill information with one or more second customer identifiers present in the customer account information and identify one or more matches between the one or more first customer identifiers and the one or more second customer identifiers;

aggregate information of the plurality of bills;

present, by a graphical user interface on a user device associated with the customer while a bill pay application is in an unlaunched state, a notification including at least one summary of the aggregated information of the plurality of bills, the at least one summary comprising an amount of the plurality of bills;

automatically launch, by the user device, the bill pay application in response to the customer selecting a summary of the at least one summary;

automatically navigate, by the user device, to a sub-screen of the bill pay application, the sub-screen presenting the selected summary;

receive, via the bill pay application, a request to pay an amount of funds to the biller;

generate a payment request comprising the customer number, the biller number, and the amount of funds;

provide, via a transaction management system, at least one post to a funds account circuit based on the payment request, the at least one post comprising instructions to deduct the amount of funds from a customer account associated with the customer number and add the amount of funds to a biller account associated with the biller number, responsive to determining that the customer number and the biller number are related to financial accounts associated with the provider;

generate and provide a payment data object comprising a plurality of attributes associated with the request and the customer to a biller computing system, wherein generating and providing the payment data object to the biller computing system further comprises enabling, with an application programming interface (API), the biller computing system to access the provider computing system to retrieve the payment data object, and wherein the plurality of attributes comprises at least a current value attribute; and update, via the API, the current value attribute of the payment data object to a new value based on the amount of funds.

14. The one or more non-transitory computer-readable storage media of claim 13, having instructions stored thereon that, when executed by the at least one processing circuit, cause the at least one processing circuit to:

update the customer account and the biller account based on the payment data object;

generate a bill data object that comprises the customer number, the amount of funds, and the biller number.

15. The one or more non-transitory computer-readable storage media of claim 13, having instructions stored thereon that, when executed by the at least one processing circuit, cause the at least one processing circuit to:

generate a second graphical user interface for presentation to the customer based on the bill information and in response to the bill pay application being launched, the second graphical user interface allowing the customer to initiate a second payment request to pay a second amount of funds; and present the second graphical user interface on the user device.

* * * * *